_(12)_ United States Patent
Cancro et al.

(10) Patent No.: US 9,257,122 B1
(45) Date of Patent: Feb. 9, 2016

(54) AUTOMATIC PREDICTION AND NOTIFICATION OF AUDIENCE-PERCEIVED SPEAKING BEHAVIOR

(71) Applicants: Debra Bond Cancro, Marriottsville, MD (US); George Joseph Cancro, Marriottsville, MD (US)

(72) Inventors: Debra Bond Cancro, Marriottsville, MD (US); George Joseph Cancro, Marriottsville, MD (US)

( * ) Notice: Subject to any disclaimer, the term of this patent is extended or adjusted under 35 U.S.C. 154(b) by 431 days.

(21) Appl. No.: 13/960,798

(22) Filed: Aug. 6, 2013

Related U.S. Application Data

(60) Provisional application No. 61/680,148, filed on Aug. 6, 2012.

(51) Int. Cl.
*G10L 17/26* (2013.01)

(52) U.S. Cl.
CPC ..................... *G10L 17/26* (2013.01)

(58) Field of Classification Search
CPC ... G10L 15/00; G10L 2015/025; G10L 28/48; G10L 25/63
USPC ......... 704/263, 270, 243, 251, 250, 236, 249, 704/254
See application file for complete search history.

(56) References Cited

U.S. PATENT DOCUMENTS

| | | | |
|---|---|---|---|
| 3,855,416 A | 12/1974 | Fuller | |
| 4,675,904 A | 6/1987 | Silverman | |
| 5,647,834 A | 7/1997 | Ron | |
| 6,151,571 A | 11/2000 | Pertrushin | |
| 6,173,260 B1 | 1/2001 | Slaney | |
| 6,427,137 B2 | 7/2002 | Petrushin | |
| 6,480,826 B2 | 11/2002 | Pertrushin | |
| 6,705,869 B2 | 3/2004 | Schwartz | |
| 7,222,075 B2 | 5/2007 | Petrushin | |
| 7,818,179 B2 | 10/2010 | Krasikov | |
| 7,917,366 B1 | 3/2011 | Levanon | |
| 7,941,318 B2 | 5/2011 | Lu | |
| 8,340,968 B1 | 12/2012 | Gershman | |
| 8,457,967 B2 | 6/2013 | Audhkhasi | |
| 8,682,666 B2 | 3/2014 | Degani | |
| 2006/0106611 A1 | 5/2006 | Krasikov | |
| 2007/0250318 A1 | 10/2007 | Waserblat | |
| 2011/0141258 A1* | 6/2011 | Song ................. | G06K 9/00268 348/77 |
| 2012/0264095 A1* | 10/2012 | Yu ......................... | G09B 19/00 434/236 |

(Continued)

OTHER PUBLICATIONS

Chang, Thompson, "Whines, Cries, and Motherese: Their Relative Power to Distract" (Journal of Social, Evolutionary, and Cultural Psychology, 2011, 5(2), 10-20. ).

(Continued)

*Primary Examiner* — Albert Wong

(57) ABSTRACT

Systems and methods are provided for indicating an audience member's perception of a speaker's speech by receiving a speech sample associated with a speaker and then by analyzing the speech to predict whether an audience would perceive the speech as exemplary of good or poor behavior. This can be also used to notify people when they exhibit good or poor behaviors. For example, good or poor behaviors could include: condescending, whining, nagging, weak, strong, refined, kind, dull, energetic, interesting, boring, engaging, manipulative, likeable, not likeable, sincere, artificial, soothing, abrasive, pleasing, aggravating, inspiring, unexciting, opaque, clear, etc. This invention has applicability to areas such as consumer self-improvement, corporate training, presentation skills training, counseling, and novelty.

20 Claims, 3 Drawing Sheets

(56) References Cited

U.S. PATENT DOCUMENTS

| | | | |
|---|---|---|---|
| 2013/0268273 A1* | 10/2013 | Chen | G10L 17/26 704/249 |
| 2014/0025385 A1* | 1/2014 | Atri | H04N 21/42203 704/270 |
| 2014/0052792 A1* | 2/2014 | Dunko | H04M 1/72547 709/206 |
| 2014/0163960 A1* | 6/2014 | Dimitriadis | G10L 17/26 704/9 |
| 2014/0220526 A1* | 8/2014 | Sylves | G06Q 30/0201 434/238 |
| 2014/0244264 A1* | 8/2014 | Thirumalainambi | G06F 17/2785 704/270 |
| 2014/0249823 A1* | 9/2014 | Hayakawa | G10L 25/63 704/270 |

OTHER PUBLICATIONS

Renee Grant Williams, "Voice Power: Using your Voice to Captivate, Persuade, and Command Attention".

Yacoub, Sherif, Recognition of Emotions in Interactive Voice Response System, symposium, Sep. 2003, Eurospeech Conference on Speech Communication Technology, Geneva, Switzerland.

* cited by examiner

AUTOMATIC PREDICTION AND NOTIFICATION OF AUDIENCE-PERCEIVED SPEAKING BEHAVIOR

CROSS REFERENCE TO RELATED APPLICATIONS

The present application claims priority of U.S. Provisional Application No. 61/680,148 filed Aug. 6, 2012 entitled "System and Methods for Coupled Speech Analysis and Feedback for the Self-Improvement of Emotional Intelligence and Communication Skills" which are incorporated herein by reference.

TECHNICAL FIELD

This invention relates to speech behavior improvement and more specifically, to systems, methods, and computer products for the automatic prediction of speech behavior(s) attributed by human listeners to the speaker. The invention has applicability to areas such as consumer self-improvement, corporate training, presentation skills training, marriage counseling, and novelty.

BACKGROUND

Speech analysis for the determination or classification of aspects of the speaker is well known in the prior art. Multiple patents describe speech analysis for the purposes of detecting the emotion in a user and providing feedback (e.g., U.S. Pat. Nos. 6,151,571, 5,647,834). Other patents describe detection of stress (U.S. Pat. No. 3,855,416), deception (U.S. Pat. No. 3,855,416), nervousness (U.S. Pat. No. 6,427,137), suicidal predisposition (U.S. Pat. No. 4,675,904), etc. Common to all this prior art is the concept of detecting autonomic responses in the user voice (i.e. while speaking, the user's current physiological state appears in features within their voices).

While these prior systems utilize speech analysis to determine the emotion or physiological state of a speaker, it is desirable to understand the impact of a user's speech behavior on an audience of one or more. Generally, speech behavior is not an autonomic response. For example, a speaker can be angry and condescending as well as neutral and condescending. In both cases, the speaker's audience would ascribe a condescending speaking behavior to the speaker.

Devices, Systems, and methods for detecting and notifying the user of poor speech behavior have been disclosed in prior art.

U.S. Pat. No. 6,705,869 discloses a "system and method for interactive communications skill training" that "includes the steps of analyzing the user interaction by an expert and providing the expert analysis to the user via the communication network for review by the user to interactively learn the communication skill."

U.S. Pat. No. 7,818,179 discloses devices and methods "for automatically analyzing a user's conversation or verbal presentation and providing feedback to the user, in real-time and/or off-line, to make the user aware of improper speech habits and thus enable the user to acquire better language habits while speaking." Where "An identified speech habit comprises exceeding a range of volume of speaking a word or expression specified in the vocabulary list that are identified during the speech session."

U.S. Pat. No. 7,941,318 discloses a "public speaking self-evaluation tool that helps a user practice public speaking in terms of avoiding undesirable words or sounds, maintaining a desirable speech rhythm, and ensuring that the user is regularly glancing at the audience."

U.S. Pat. No. 8,340,968 discloses a "computer-implemented method for automatically training diction of a person" based on "detection of one of the predefined undesirable phrases in the speech data stream".

U.S. Pat. No. 8,457,967 discloses a "procedure to automatically evaluate the spoken fluency of a speaker by prompting the speaker to talk on a given topic, recording the speaker's speech to get a recorded sample of speech, and then analyzing the patterns of disfluencies in the speech to compute a numerical score to quantify the spoken fluency skills of the speakers".

U.S. Application US2007/0250318 discloses a "system for providing automatic quality management regarding a level of conformity to a specific accent".

While these prior systems provide methods for the evaluation or identification of certain aspects of speaking behavior, it is desirable for users to be made aware of the impact of their behavior on an audience. In this context, speaking behavior can cause an audience of 1 or more people to view the speaker as condescending, whining, nagging, weak, manipulative, likeable, confident, arrogant, aggressive, tentative, energetic, engaging, instructional, sincere, etc. It is further desirable that this awareness of the impact of user's historical speech behavior be made available for the user to review sometime in the future at their leisure. It is yet further desirable for the awareness to be automatic and without the need of human experts evaluating user behavior so that the cost to users for this invention is limited.

SUMMARY OF THE INVENTION

Embodiments disclosed herein address the above stated needs by providing computer-implemented methods, computer systems, and software products for indicating an audience member's perception of a speaker's speech.

The method for indicating an audience member's perception of a speaker's speech includes the steps of receiving a speech sample associated with a speaker; processing, via a computer, the speech sample to identify one or more speech characteristics; receiving one or more vocal characteristics, each of said one or more vocal characteristics indicating a predetermined audience perception; comparing, via a computer, said one or more speech characteristics with said one or more vocal characteristics; determining, based on the comparison, an audience perception associated with said one or more speech characteristics, and indicating to the speaker, the determined audience perception. In some embodiments, the method may also include the additional steps of converting the speech sample to text using an automatic speech recognizer; and computing lexical features from an output of the automatic speech recognizer. In some embodiments, the method may also include distinguishing in real-time, the speech input of the primary user from additional speakers. The method may indicate the determined audience perception to the speaker through at least one of: a visual display; an auditory device; or a tactile device. The method may derive the audience perception from an audience comprising a plurality of audience members. The method may accumulate historical data reflecting the determined audience perception for the speaker over a period of time, wherein the historical data may be stored to a database and may be accessible to the speaker through a user interface. In addition, the method may store speech samples with the historical data, wherein the speech samples may be stored to said database and may be accessible to the speaker through said user interface. The method may establish an audience perception for a particular vocal characteristic when a predetermined percentage of audience members consider said vocal characteristic to indicate a particular behavior.

The computer system for indicating an audience member's perception of a speaker's speech includes a data storage device; a recording device configured to revieve a speech sample from a user; a display device; and at least one processor, operatively coupled to the data storage device and configured to process a speech sample to identify one or more speech characteristics; receive one or more vocal characteristics that indicate a predetermined audience perception; compare one or more speech characteristics with said one or more vocal characteristics; determine, based on the comparison, an audience perception associated with said one or more speech characteristics; and indicate to the speaker, the determined audience perception via said display device. In some embodiments, the computer system may also include at least one processor further configured to convert the speech sample to text using an automatic speech recognizer; and compute lexical features from an output of the automatic speech recognizer. In some embodiments, the computer system may also include at least one processor further configured to distinguish in real-time, the speech input from the primary user from additional speakers. The computer system may also include an auditory device; and a tactile device for indicating the determined audience perception to the speaker. The computer system may derive the audience perception from an audience comprising a plurality of audience members. The computer system may also include at least one processor further configured to accumulate historical data reflecting the determined audience perception for the speaker over a period of time, wherein the historical data may be stored to a database and may be accessible to the speaker through a user interface. In addition, the computer system may also include at least one processor further configured to store speech samples with the historical data, wherein the speech samples may be stored to said database and may be accessible to the speaker through said user interface. The computer system may also include at least one processor further configured to establish an audience perception for a particular vocal characteristic when a predetermined percentage of audience members consider said vocal characteristic to indicate a particular behavior.

The software product for indicating an audience member's perception of a speaker's speech comprises a program of instructions stored on a machine readable device, wherein the program of instructions upon being executed on a computer cause the computer to perform the following activities comprising: receiving a speech sample associated with a speaker; processing, via a computer, the speech sample to identify one or more speech characteristics; receiving one or more vocal characteristics, each of said one or more vocal characteristics indicating a predetermined audience perception, wherein the audience perception is derived from an audience comprising a plurality of audience members, wherein the audience perception is established for a particular vocal characteristic when a predetermined percentage of audience members consider said vocal characteristic to indicate a particular behavior; comparing, via a computer, said one or more speech characteristics with said one or more vocal characteristics; determining, based on the comparison, an audience perception associated with said one or more speech characteristics; and indicating, to the speaker, the determined audience perception. In some embodiments, the software product further comprises the activities of converting the speech sample to text using an automatic speech recognizer; and computing lexical features from an output of the automatic speech recognizer. In some embodiments, the software product further comprises the activities of distinguishing in real-time, the speech input of the primary user from additional speakers. The software product further comprises the activities of a indicating the determined audience perception to the speaker through an auditory device; and a tactile device.

Other embodiments, aspects, features and advantages of the present invention will be readily appreciated as the same becomes better understood after reading the subsequent description when considered in connection with the accompanying drawings.

DESCRIPTION OF THE DRAWINGS

These and other advantages of the present invention will be readily understood with reference to the following specifications and attached drawings wherein.

DETAILED DESCRIPTION

Preferred embodiments of the present invention will be described hereinbelow with reference to the accompanying drawings. In the following description, well-known functions or constructions are not described in detail because they may obscure the invention in unnecessary detail. The present invention relates to an automatic system and method for detecting and notifying a user of their speaking behavior as perceived by an audience of 1 or more.

Humans, for whatever reason, have developed spoken communication behaviors that are designed to have an impact on our audiences. For example, a child may learn to whine to get their way. According to Chang and Thompson in their article "Whines, Cries, and Motherese: Their Relative Power to Distract" (Journal of Social, Evolutionary, and Cultural Psychology, 2011, 5(2), 10-20.) "whines [are] part of an attachment vocalization system that exploit an auditory sensitivity shared by humans". In another example, a person will attempt to be inspiring if they are trying to set a future direction for an audience. In another example, a wife may "nag" her spouse if he is not responsive.

In some cases, these behaviors may turn into unnoticed and/or unacknowledged pattern or habit. For example, a condescending teenager could be behaving in a condescending manner every time they speak to their parent. But when confronted, the teenager might not acknowledge they are doing anything wrong.

In other cases, these behaviors may be desirable and a user may want to reproduce the behavior with a high confidence of the effect of his/her spoken communication on his/her audience. For example when giving an important speech.

Automatic prediction of speech behavior attributed by one or more human listeners to the speaker can be used to provide information indicating how a user's speech is perceived by listeners. This can be used to notify people when they exhibit good or poor behaviors. This invention has applicability to areas such as consumer self-improvement, corporate training, presentation skills training, marriage counseling, and novelty.

Figure 1:
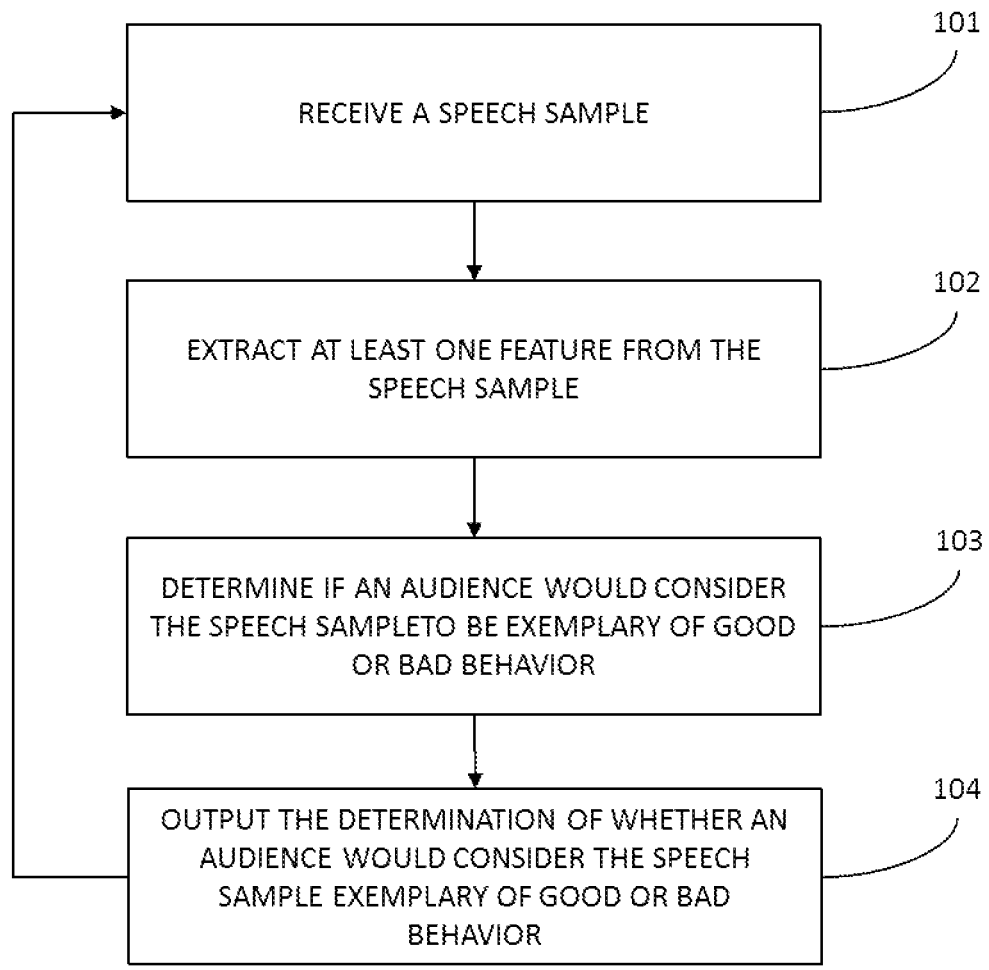
FIG. 1. Is a flowchart depicting one embodiment of the present invention for making users aware of a typical audience view of the user's speaking behavior.

FIG. 1 depicts an overview of the speech behavior detection scheme according to various embodiments. Operation 101 represents the receipt of a user's voice signal to be used in evaluating the user's speech to predict how the user would be perceived by an audience in terms of poor or good speaking behavior for the purpose of helping the user be aware of the impact of his/her speech on hearers. In some scenarios, the user may be wearing the system and the voice signal is part of the user's everyday conversations. In other scenarios, the user may be using the system to practice speaking and the voice signal can be provided by the user specifically for evaluation by the system.

In the scenarios where a user employs the invention over a period of time, the operation of receiving a speech sample (101), also includes the additional step of voice activity detection to segment the speech into voiced and non-voiced segments. The non-voice segments are removed such that only the voiced segments proceed to the next operation (102).

In other scenarios, a conversation between the user and other persons or multiple users is received as the voice signal. For example, a family may want to place the system on their dinner table to monitor their family dinner conversation for elements of whining or condescending behavior. In another example, a therapist in a counseling situation may want to place the system in such a way to monitor rude or manipulative behavior between a couple he/she may be counseling.

In the scenarios where samples from multiple speakers are possible to be received by this invention, the operation of receiving a speech sample also can include the additional step of speaker recognition; where segments of the speech sample are divided up based on the determination of which speaker is speaking during that segment. In some embodiments, the segments that do not contain the primary user may be removed such that only the segments of the primary user proceed to the next operation (102). In other embodiments, the segments of all speakers can proceed to the next operation (102). In this case, the output of the invention (104) can be segmented as well (e.g., speaker 1's speech would not be considered exemplary of any behavior, speaker 2's speech would be considered exemplary of whining behavior).

The speech sample may be presented to the system through the audio input device that is a part of the system or through the user providing a digitized sample (e.g., computer file of the voice signal). The speech sample may be received in analog or digital format depending upon the particularities of the attributes of the system being used to gather the sample. At some point any analog format must be digitized to facilitate feature extraction.

Once the voice signal has been collected, at least one feature related to audience perception is extracted from the voice signal, 102. Features to extract are identified through the development of a corpus of speakers exhibiting the poor and good speech behaviors. The corpus includes short passages from males and females who are selected to ensure for variability in pitch and tonal quality. The voice samples from each of the speakers are analyzed to identify features which are characteristic of the speech behavior.

In some embodiments the features that related to audience perception may include one or more of the following: duration of phonemes within an utterance, duration of the maximum phoneme, location of the maximum duration phoneme in relationship to the utterance, location of the $2^{nd}$ longest duration phoneme in relationship to the utterance, number of phonemes within an utterance, and parameters of $1^{st}$, $2^{nd}$, or $3^{rd}$ order curve fit of 'feature X' over an utterance, location of the maximum of 'feature X' in relationship to the utterance, location of minimum of 'feature X' in relationship to the utterance, slope of 'feature X' at the end of utterance, slope of 'feature X' at the beginning of an utterance, the standard deviation of 'feature X' over the utterance, and the comparison of the location of one feature within an utterance to the location of another feature in an utterance. Where, in some embodiments, 'feature X' includes: delta pitch from mean utterance pitch, delta energy from mean utterance energy, total energy within a Mel-Frequency band over the utterance, and/or delta energy within a Mel-Frequency band from mean utterance energy in that band. For example, the long duration of a phoneme in the middle of the utterance combined with maximum delta energy in the same location with a rising delta pitch after the long duration phoneme may be used to reveal a condescending behavior in the statement "You are not going to do THAT are you?" where the phoneme associated with the 'THAT' is the longest in the utterance and has the maximum delta energy and is followed by rising delta pitch on the "are you".

In some embodiments, identified features may be extracted from the speech sample using standard signal and voice processing techniques. For example features could include: energy of the speech signal, speaking rate, duration of pauses, frequency of pauses, Mel-frequency cepstral coefficients, zero-crossing rate, linear prediction coefficients, one or more formants and/or the statistical properties (minimum, maximum, mean, relative entropy, and/or standard deviation) of the above features. In other embodiments, identified features may be extracted from the speech sample by the additional steps of: converting the speech sample to text using an automatic speech recognizer; and computing lexical features from an output of the automatic speech recognizer. For example, the use of the words "always" or "never" may be used to reveal a manipulative behavior and the words "When are you going to" may be used to reveal nagging.

Utilizing the feature(s) obtained in operation 102, whether an audience would consider the speech sample to be exemplary of good or bad behavior can be determined in operation 103 based on the extracted feature(s). This determination can performed through a machine learning algorithm that has been trained on the corpus, described above, coupled with a set of ratings for each corpus sample. The machine learning algorithm could include any number of learning approaches: C4.5 decision trees, nearest neighbor, Naïve Bayes, Support Vector Machines, and Hidden Markov Models. These algorithms could be used singularly or in combination (e.g. the output of one or more algorithm(s) could be input into other algorithm(s)). The ratings are generated from participants who listen to and judge whether each of the audio segments exemplifies one of the speech behaviors.

This determination 103 may also be performed by a classifier that compares the features obtained in operation 102 with values of those features that may have been determined through human analysis in the fields of pragmatic speech, social psychology, speech pathology, and voice coaching. For example, Renee Grant Williams in her book "Voice Power: Using your Voice to Captivate, Persuade, and Command Attention" has postulated that whining is a two node descending voice slide between two notes by using a particular interval in music that is called an augmented forth or diminished fifth. Whining, then, may be revealed by classifier that determines the distance between the speakers pitch and pitch change to the augmented forth or diminished fifth note range and note slide.

In some embodiments, a combination of corpus-trained machine learning and human analysis based classification may be utilized to determine whether an audience would consider the speech sample to be exemplary of good or bad behavior.

In some embodiments, the speech behaviors may include one or more of the following: condescending, whining, nagging, weak, strong, refined, kind, dull, energetic, interesting, boring, engaging, manipulative, likeable, not likeable, sincere, artificial, soothing, abrasive, pleasing, aggravating, inspiring, unexciting, opaque, clear and so on and so forth.

In some embodiments, operation 103 could be replaced or augmented with a similar operation that predicted the percentage of a typical audience that would consider the speech sample to be exemplary of poor or good speech behavior(s). In other embodiments, operation 103 could be replaced or augmented with a similar operation that predicted how strongly hearers would consider that the sample exemplifies the good or bad behavior(s).

Finally, in operation 104, the prediction of whether an audience of 1 or more people would consider the voice signal exemplary of good or bad behavior(s) can be output. In one embodiment, the output may be a change in the user display.

In some embodiments, the operations described above, may be performed one time for each specific sample. In other embodiments, the operations may be performed continuously as shown in FIG. 1 by the line connecting operation 104 to operation 101.

Figure 2:
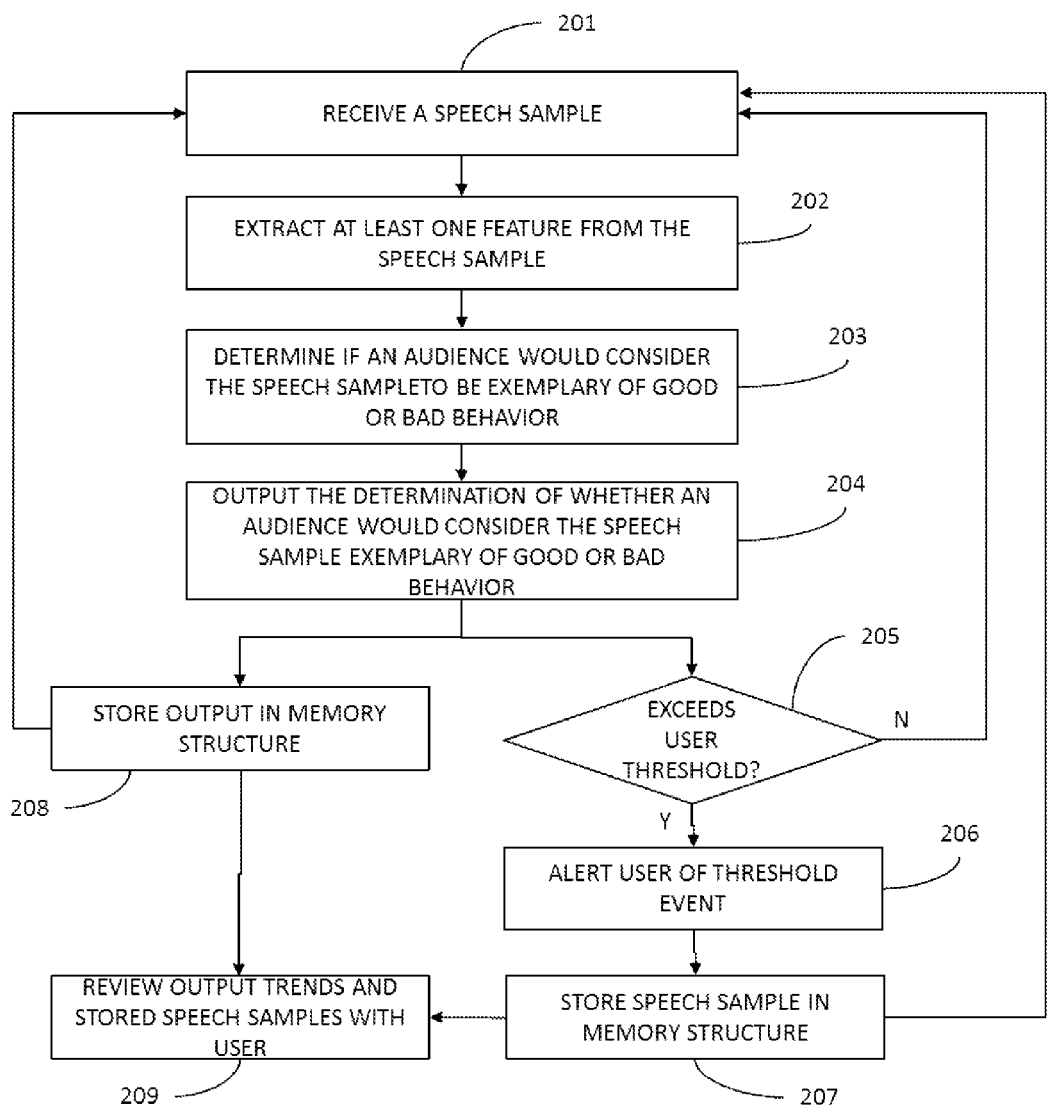
FIG. 2. Is a flowchart depicting one embodiment of the present invention for making users aware of a typical audience view of the user's speaking behavior that includes operations used to notify the user of the their behavior.
Figure 3:
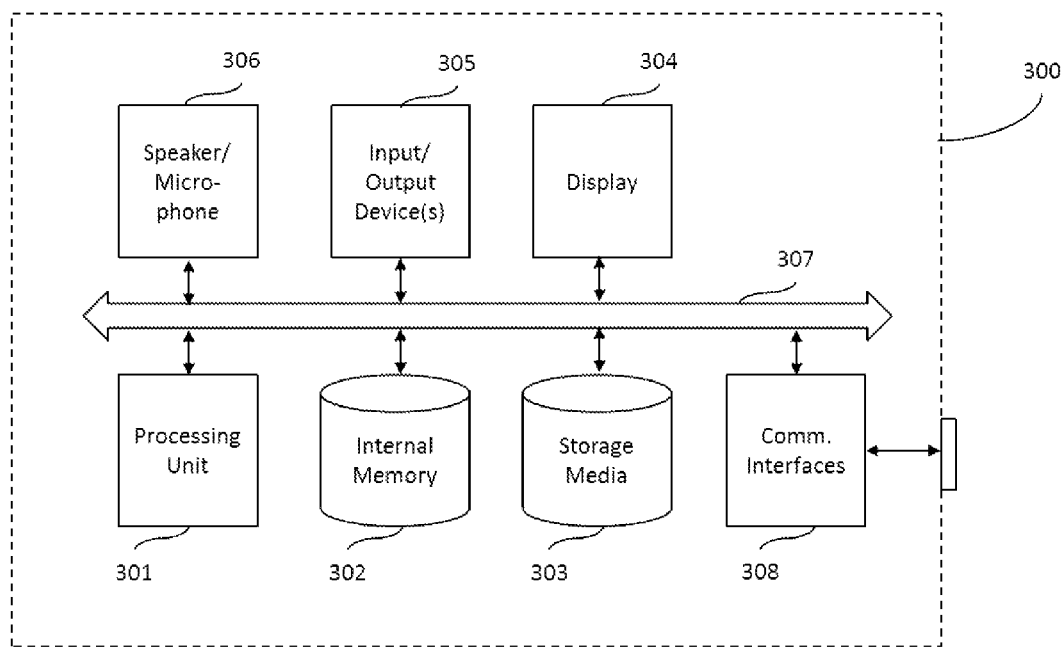
FIG. 3 is a schematic diagram of a hardware implementation of one embodiment of the present invention.

FIG. 2 depicts an embodiment of the present invention for making users aware of a predicted audience's view of the user's speaking behavior that includes operations used to notify the user of the their behavior. Operation 201, 202, 203, and 204 are equivalent to operation 101, 102, 103, and 104 respectively that are depicted in FIG. 1 and described above.

In FIG. 2 the output of operation 204 can be compared against a user-defined threshold (operation 205), such that if the threshold is exceeded, the user may be alerted (operation 206). In embodiments wherein the output is whether an audience would consider the speech sample to be exemplary of good or bad behavior(s), the threshold could be the existence of the speech behavior(s). In embodiments wherein the output is a percentage of an audience that would consider the speech sample to be exemplary of poor or good speech behavior(s), the threshold could be a user-defined percentage value. In embodiments wherein the output is a level representing how strongly the sample exemplifies the good or bad behavior(s), the threshold could be a user-defined level value.

In some embodiments, the alert of operation 206 may be a change in the display. In other embodiments, the alert of operation 206 may be a tactile output (e.g., vibration of the system). In other embodiments, the alert of operation 206 may be an audible sound. In other embodiments, the alert could be a combination of embodiments described above.

Once an alert occurs, the speech sample that caused that event can be stored in a memory structure for future review by the user (operation 207).

In parallel to these activities, the outputs of operation 204 can be stored in a memory structure for future review by the user (operation 208).

If the user wanted to view the outputs of operation 204 over time or wanted to hear the speech samples that resulted in alerts (operation 207), the user could review the stored output trends and stored speech samples in operation 209. In other embodiments, operation 209 can be performed on another computing system connected via a network to the system of this invention.

FIG. 4 depicts a computer system 300 suitable for implementing and practicing various embodiments. The computer system 300 may be configured in the form of a desktop computer, a laptop computer, a mainframe computer, a tablet, a wireless handset (e.g., a smartphone), personal digital assistants (PDA), or any other arrangement capable of being programmed or configured to carry out instructions. The computer system 300 may be located and interconnected in one location, or may be distributed in various locations and interconnected via communication links such as a local or wide area network (LAN or WAN), via the Internet, via the public switched telephone network (PSTN), or other such communication links.

Typically, a computer system 300 includes a processor 301 which may be embodied as a microprocessor or central processing unit (CPU). The processor 301 may be configured to access an internal memory 302, generally via a bus such as the system bus 307. The internal memory 302 may include one or more of random access memory (RAM), read-only memory (ROM), cache memory, or a combination of these or other like types of circuitry configured to store information in a retrievable format. In some implementations the internal memory 302 may be configured as part of the processor 301, or alternatively, may be configured separate from it but within the same packaging. The processor 301 may be able to access internal memory 302 via a different bus or control lines than is used to access the other components of computer system 300.

The computer system 300 also includes, or has access to, one or more storage media 303 (or other types of storage memory). Storage media 303 are examples of machine readable (also called computer readable) mediums suitable for storing the final or interim results of the various embodiments. The computer system 300 may either include the storage media 303 as part of its architecture (e.g., within the same cabinet or enclosure and/or using the same power supply), as connected peripherals, or may access the storage media 303 over a network, or a combination of these. The storage media 303 is often a hard disk drive configured for the storage and retrieval of data, computer programs or other information. The storage media 303 need not necessarily be contained within the computer system 300. For example, in some embodiments the storage media 303 may be server storage space within a network that is accessible to the computer system 300 for the storage and retrieval of data, computer programs or other information. In some instances the computer system 300 may use storage space at a server storage farm, or like type of storage facility, that is accessible through the communications interfaces 308. The storage media 303 is often used to store the software, instructions and programs executed by the computer system 300, including for example, all or parts of the computer application program for carrying out various embodiments of the invention.

The computer system 300 may include communication interfaces 308 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The computers system 300 may be connected to the Internet via the wireless router, or a wired router or other such access node (not shown). The components of computer system 300 may be interconnected by a bus 307 and/or may include expansion slots conforming to any of various industry standards such as PCI (Peripheral Component Interconnect), ISA (Industry Standard Architecture), or EISA (enhanced ISA).

Typically, the computer system 300 includes one or more user input/output devices 305 such as a keyboard and/or mouse, or other means of controlling the cursor represented by the user input devices (e.g., touchscreen, touchpad, joystick, trackball, etc.). The communication interfaces 308, and user input devices 305 may be used in various combinations, or separately, as means for receiving information and other inputs to be used in carrying out various programs and calculations. A display 304 is also generally included as part of the computer system 300. The display may be any of several types of displays, including a liquid crystal display (LCD), a cathode ray tube (CRT) monitor, a thin film transistor (TFT) array, or other type of display suitable for displaying information for the user. The display 304 may include one or more light emitting diode (LED) indicator lights, or other such display devices. In addition, the computer systems 300 may include, or may be connected to, one or more speakers and microphones 306 for audio output and input.

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. A method of alerting a user of condescending speech comprising:
   receiving speech from at least one user;
   processing the speech to identify one or more phonemes;
   processing the identified one or more phonemes wherein the processing identifies the duration, the maximum duration, and the location(s) of the one or more phonemes to identify at least one feature of the speech;
   comparing the at least one feature to previously determined features; and
   alerting the user that the received speech contains condescending speech if the comparison exceeds a threshold.

2. The method of claim 1, wherein the previously determined features is obtained by processing human speech.

3. The method of claim 2, wherein human speech includes good and condescending speech.

4. The method of claim 1, further comprising identifying words used in the received speech and using the words as a factor in determining condescending speech.

5. The method of claim 1, wherein the threshold is based on the percentage of people who would consider the speech condescending.

6. The method of claim 1, wherein the threshold is based on whether people would consider the speech to be good or bad behavior.

7. The method of claim 1, further comprising the step of storing the speech or storing the alerts for future review.

8. The method of claim 1, wherein the alert is audible, tactile or visual.

9. The method of claim 1, where the received speech is from a plurality of users.

10. The method of claim 1, wherein the received speech is processed to determine the number of alerts in the received speech and outputting a rating based on the number of alerts and the time duration of the received speech.

11. The method of claim 1, wherein the method is performed on plurality of speech samples individually to determine a number of alerts in each speech sample, and presenting a rating based on the total number of alerts from the speech samples and the total time duration of the speech samples.

12. The method of claim 1, further comprising the step of processing the speech to identify the energy of the speech, speaking rate, duration of pauses, frequency of pauses, Mel-frequency spectral coefficients, zero-crossing rate, linear prediction coefficients, and/or one or more formants.

13. The method of claim 1, further comprising the step of determining statistical properties of the minimum, maximum, mean, relative entropy, or standard deviation of the features.

14. The method of claim 1, further comprising the step of converting the speech to text using an automatic speech recognizer and computing lexical features from an output of the automatic speech recognizer.

15. A device for determining condescending speech comprising:
   a processor;
   instructions executed on the processor for receiving speech, processing the speech to identify one or more phonemes, processing the identified one or more phonemes wherein the processing identifies the duration, the maximum duration, and the locations of the one or more phonemes to identify at least one feature of the speech, comparing the at least one feature to features in a database, and generating an alert signal when the comparison exceeds a threshold; and
   an alert means for providing human perceptible indication in response to the alert signal.

16. The device in claim 15, further comprising:
   instructions for the processor to identifying words used in the received speech and using the words as a factor in determining condescending speech.

17. The device in claim 15, wherein the device is portable and the alert means is located in the device.

18. The device in claim 15, wherein the alert means provides an indication that is audio, visual or tactile.

19. The device in claim 15, wherein the processor includes instructions to determine the number of alert signals generated from the received speech and the length of the received speech to determine a rating and further comprises a display to show the rating.

20. The device in claim 15, wherein the processor executes the instructions recited in claim 1 on a plurality of speech samples and determines the number of alerts for each speech sample and determines a rating based on the total number of alerts and the total time duration of the plurality of speech samples.

* * * * *